United States Patent
Morlock

(10) Patent No.: US 9,903,720 B2
(45) Date of Patent: Feb. 27, 2018

(54) METHOD AND APPARATUS FOR CREATING COST DATA FOR USE IN GENERATING A ROUTE ACROSS AN ELECTRONIC MAP

(71) Applicant: TomTom Global Assets B.V., Amsterdam (NL)

(72) Inventor: Clayton Richard Morlock, Lebanon, NH (US)

(73) Assignee: TOMTOM INTERNATIONAL B.V., Amsterdam (NL)

( * ) Notice: Subject to any disclaimer, the term of this patent is extended or adjusted under 35 U.S.C. 154(b) by 0 days.

(21) Appl. No.: 15/256,835

(22) Filed: Sep. 6, 2016

(65) Prior Publication Data

US 2017/0082443 A1    Mar. 23, 2017

Related U.S. Application Data

(63) Continuation of application No. 14/356,630, filed as application No. PCT/US2012/065742 on Nov. 19, 2012, now Pat. No. 9,433,843.

(60) Provisional application No. 61/561,345, filed on Nov. 18, 2011.

(51) Int. Cl.
| | |
|---|---|
| G01C 21/34 | (2006.01) |
| G08G 1/123 | (2006.01) |
| G01C 21/20 | (2006.01) |
| G06T 17/00 | (2006.01) |
| G06F 17/30 | (2006.01) |
| A63B 69/00 | (2006.01) |
| G09B 29/00 | (2006.01) |
| G01G 21/00 | (2006.01) |
| G06T 17/05 | (2011.01) |

(52) U.S. Cl.
CPC .......... *G01C 21/20* (2013.01); *A63B 69/0028* (2013.01); *G06F 17/30241* (2013.01); *G06T 17/00* (2013.01); *G09B 29/007* (2013.01); *A63B 2220/30* (2013.01); *A63B 2220/62* (2013.01); *A63B 2230/06* (2013.01); *G06T 17/05* (2013.01)

(58) Field of Classification Search
CPC .... A63B 69/0028; G01C 21/20; G01C 21/36; G09B 27/007
USPC ................................... 701/201, 533
See application file for complete search history.

(56) References Cited

U.S. PATENT DOCUMENTS

| | | | |
|---|---|---|---|
| 8,694,242 B2 | 4/2014 | Nagase | |
| 2011/0004397 A1 | 1/2011 | Nagase | |
| 2011/0054779 A1* | 3/2011 | Kim | G01C 21/3484 |
| | | | 701/533 |

FOREIGN PATENT DOCUMENTS

CN      101960500 A    1/2011

* cited by examiner

*Primary Examiner* — Mahmoud S Ismail

(57) ABSTRACT

A method is disclosed involving receiving GPS data from persona portable training devices of users when traversing an off-road segment of an electronic map together with associated data indicative of a heart rate of a user during the movements. The position and heart rate data for each user traversing the segment are processed using data indicative of a fitness profile for the user. The resulting data is used to determine a normalized cost to be associated with the segment, indicative of the difficulty in traversing the segment. The cost data is generated using a neural network. The resulting cost data for different segments in a network of segments is used to generate route suggestions for users based upon desired workout intensity, fitness levels, etc.

17 Claims, 6 Drawing Sheets

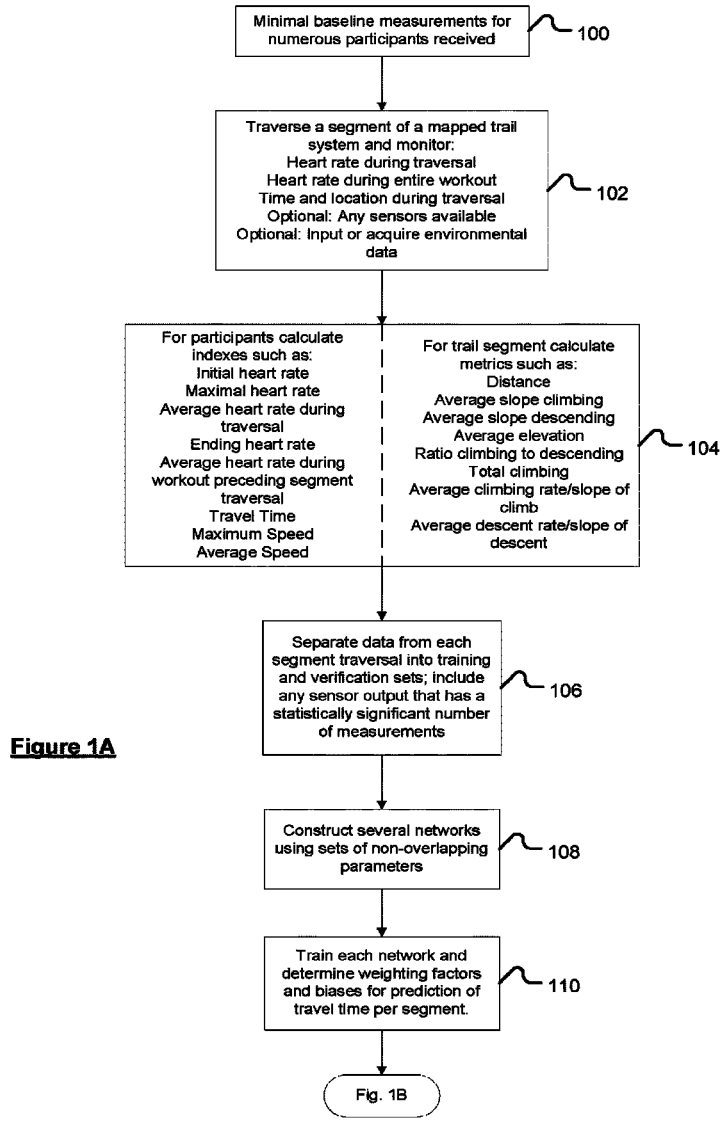

METHOD AND APPARATUS FOR CREATING COST DATA FOR USE IN GENERATING A ROUTE ACROSS AN ELECTRONIC MAP

FIELD OF THE INVENTION

This invention relates to methods and systems for determining cost data for use in generating a route across an electronic map. The method is particularly, although not exclusively, concerned with determining cost data in respect of traversing navigable segments of an electronic map that are off-road segments. The invention provides methods and systems for determining cost data associated with the traversal of segments of the electronic map at least partially under a user's own power.

BACKGROUND OF THE INVENTION

Portable navigation devices (PNDs) that include GNSS (Global Navigation Satellite Systems) signal reception and processing functionality are well known and are widely employed as in-car or other vehicle navigation systems. Such devices include a GNSS antenna, such as a GPS antenna, by means of which satellite-broadcast signals, including location data, can be received and subsequently processed to determine a current location of the device. The PND device may also include electronic gyroscopes and accelerometers which produce signals that can be processed to determine the current angular and linear acceleration, and in turn, and in conjunction with location information derived from the GPS signal, velocity and relative displacement of the device and this vehicle in which it is typically mounted. Such sensors are most commonly provided in in-vehicle navigation systems, but may also be provided in the PND device itself.

In recent years, GPS has started to be used for pedestrian and outdoor applications. Currently there are a significant number of portable personal training devices having location determining capabilities available on the market for use e.g. in sporting activities, pedestrian travel and other outdoor applications. Portable personal training devices are devices that may be worn by runners, joggers, cyclists and other athletes and outdoor enthusiasts, etc, and which can track and record data indicative of the movement of the user over time, e.g. the pace of the user at particular moments during a workout and/or the distance covered by the user during the workout. For example, sports watches that include GPS antennas have started to be used by such users as a means to obtain real-time data of their speed, distance travelled, etc. The GPS data is also typically stored on such devices such that it can be analysed after the athlete has finished their activity, e.g. in some cases by transferring the collected data to a computer or website to be displayed as traces on a digital map (i.e. in a form of Geographic Information System (GIS)).

Such portable personal training devices can also be linked with sensors, such as a heart rate sensor (that is typically worn on a strap around a user's chest), such that heart rate data can be collected and stored on the device during a period of exercise. The collected data can then be transferred from the device to a computer or website, together with the GPS data, to allow a user to see their level of physical exertion whilst undertaking the exercise.

It is therefore known in the art to track a course for a workout, e.g. using a portable personal training device, and compare user physical parameters such as heart rate, travel time and other parameters between individuals and between separate trips for a single individual.

However, the Applicant has realised that there remains a need for a method and system that will allow routes to be proposed to users for navigation by the user under their own power, and, in particular, which involve off-road navigable segments. There is also a need for improved methods of generating an electronic map comprising off-road navigable segments.

SUMMARY OF THE INVENTION

In accordance with a first aspect of the invention there is provided a method for creating cost data for use in generating routes across an electronic map of navigable segments, the method comprising:

receiving probe data from a plurality of users, the probe data comprising, for each user, movement data indicative of the movements of the user with respect to time, and physical exertion data indicative of at least one measure of physical exertion associated with the movements of the user over time; and processing the received probe data for each user using an ability profile for the user to enable normalized routing cost data for navigable segments of the electronic map to be generated.

In accordance with the invention in any of its aspects or embodiments, the probe data comprises data indicative of the movements of multiple users over time, and associated physical exertion data relating to the movements. The movement of the user is a movement carried out under the user's own power. In other words, the movement is accompanied by physical exertion on the part of the user. The movement is carried out at least partially, and preferably entirely, under the user's own power. The movement may be any human powered movement. The movement may or may not be associated with the movement of a user powered vehicle. In embodiments involving a user powered vehicle, the user powered vehicle may be a vehicle that is entirely or partially user powered. The movement may therefore be the movement of a pedestrian user, and may be a walking, jogging or running movement of the user. In other embodiments the movement may be a movement of the user when propelling a user powered vehicle such as a boat (e.g. canoe, kayak, etc), bicycle, skis, etc. The vehicle may therefore be a land or water based vehicle. The movement may be a movement involved in a sporting, commuting or leisure activity.

In accordance with the invention, probe data is obtained from each of a plurality of users which comprises a movement component, indicative of the movements of each user with respect to time, and a physical exertion component, which is indicative of the level of physical exertion of the user when performing the movements. Thus the probe data comprises movement data for each of the plurality of users and physical exertion data associated therewith. The probe data for each user is used together with an ability profile for the respective user in the generation of normalized routing cost data for navigable segments of an electronic map.

The present invention thus provides a method of obtaining normalized cost data that may be used for generating routes across the electronic map based upon probe data obtained from multiple users. The physical exertion probe data for a given user is indicative of the level of difficulty for that user in traversing a given navigable segment. It will be appreciated that as it is carried out at least partially under the power of a user, the traversal of the same navigable segment may present differing levels of difficulty to different users depending, e.g. upon their personal fitness level, experience level, etc. The present invention takes into account such individual variation to enable normalized, i.e. standardised, cost data to be generated for segments by processing the probe data for each user together with ability profile data for the user. The ability profile data provides a way of scaling the probe data, e.g. physical exertion data, to provide data for use in generating cost data for a segment that is comparable for different users, and which enables normalized cost data to be determined using the probe data obtained from the multiple users. In this way, the navigable segments of the electronic map may be globally graded with a cost indicative of the relative difficulty of traversing the segment.

The present invention also extends to a system, optionally a server, for creating cost data for use in generating routes across an electronic map of navigable segments, the system comprising:

means for receiving probe data from a plurality of users, the probe data comprising, for each user, movement data indicative of the movements of the user with respect to time, and physical exertion data indicative of at least one measure of physical exertion associated with the movements of the user over time; and means for processing the received probe data for each user using an ability profile for the user to enable normalized routing cost data for navigable segments of the electronic map to be generated.

The present invention in this further aspect may include any or all of the features described in relation to the first aspect of the invention, and vice versa, to the extent that they are not mutually inconsistent. Thus, if not explicitly stated herein, the system of the present invention may comprise means for carrying out any of the steps of the method described.

The means for carrying out any of the steps of the method may comprise a set of one or more processors for so doing. A given step may be carried out using the same or a different set of processors to any other step. Any given step may be carried out using a combination of sets of processors.

The probe data may be used in accordance with the invention to generate normalized routing costs for navigable segments of an electronic map. The probe data received from multiple users is indicative of the movements of the users over time, and their associated exertion. In embodiments the data is indicative of the movements of the multiple users along one or more given navigable segments of the electronic map. The method may then comprise processing the probe data from the multiple users relating to travel of the users along the one or more given navigable segments using the ability profile for each user to enable normalized routing costs for each of the one or more given navigable segments to be generated.

As will be discussed in more detail below, other data in addition to the ability profile may be used to process the received probe data so as to generate the normalized routing costs, including: data indicative of historic weather conditions (e.g. during the past few days or weeks); data indicative of current and/or expected weather conditions; data indicative of the terrain or general construction of the navigable segments being traversed (e.g. concrete, gravel, mud, etc).

The one or more navigable segments referred to herein may be of any type. Preferably the or each segment is an off-road segment. A navigable segment may be any path that may be taken by a user when moving at least partially under their own power, with or without the associated movement of a human powered vehicle. A navigable segment may be a water or land based segment. A navigable segment may be a segment of a footpath, river, canal, cycle path, tow path, railway line, or the like. The segment may be a segment that is for use by a non-motorized vehicle such as a bicycle, or skis, or by motorized vehicles such as an ATV (all-terrain-vehicle), snowmobile, or off-road motorcycle. A water segment may be a segment that is for use by a canoe, kayak or the like. An off-road navigable segment may or may not be man made. For example, such a navigable segment may follow a natural path existing in a landscape and/or a path that has been made by other users, e.g. a runner-made path through a forest.

The method comprises receiving probe data from multiple users comprising movement data indicative of the movements of the users along a given path comprising one or more navigable segments with respect to time, and physical exertion data indicative of at least one measure of physical exertion associated with the movements along the given path over time. As will be appreciated, the probe data to be processed may be received directly from, for example, portable personal training devices of users. However, it is also envisaged that the probe data may be obtained from a data store. In other words, data transmitted from users may be stored at least temporarily at a first server, where it may also be pre-processed (e.g. position data may be smoothed, etc), and then the stored, optionally pre-processed, probe data may be retrieved for subsequent processing to create the normalised routing costs.

In accordance with the invention position data and associated exertion data are obtained for multiple users traversing the same navigable segment. In embodiments the navigable segment forms part of a trail that is followed by a user. Exertion data relating to different users may be obtained in respect of the traversal of a navigable segment as part of the same or different trails followed by different users. A path as referred to herein is made up of one or more navigable segments, which may be of any of the types described herein. The term "trail" as used herein refers to a path comprising one or more navigable off-road segments. The one or more off-road navigable segments may be of any of the types described above. Thus a trail may refer to an off-road trail, e.g. a pedestrian path, recreational path, river path, etc. While the present invention is described by particular reference to trails i.e. off-road paths, and off-road navigable segments, it will be appreciated that the methods of the invention may be applied to navigable segments, and paths comprising navigable segments, that are or include road type segments, e.g. permanent footpaths and the like. If not explicitly stated herein, embodiments described by reference to a "trail" may be applicable to any form of path made up of navigable segment(s), unless the context demands otherwise.

It will be appreciated that in contrast to road type navigable segments, off-road navigable segments or paths, i.e. trails, made up of such segments, may change over time, potentially with some frequency. For example, new trails may be added, trails re-routed, trails may degrade and/or be improved, etc. As the present invention determines cost data for navigable segments, and, in embodiments, the course of the navigable segments, using probe data collected from actual users, the method may provide a dynamic system that can provide accurate cost data in relation to an ever changing network of segments, and subsequently may be used to provide routing in such a changing network.

As described above, the present invention relates to creating cost data for use in generating a route across an electronic map of navigable segments. The navigable segments may be known navigable segments. In other words, the navigable segments may be predefined navigable segments of an existing electronic map. In other embodiments, the method may extend to the step of determining the navigable segments. The step is preferably carried out using the movement component of the probe data, i.e. positional data relating to the movements of users over time. The step may be carried out before determining the cost data for the segments in accordance with the invention. The method may therefore comprise the step of generating the electronic map. Of course, a combination of such techniques may be used, i.e. the electronic map may comprise a known portion and a portion that is generated using the probe data. In other words, the navigable segments of a pre-existing electronic map are continuously being updated using the received positional data from a plurality of users. In embodiments therefore the electronic map comprises a known network of navigable segments and/or the method comprises using the probe data to generate a network of navigable segments providing at least a portion of the electronic map.

In embodiments in which the method comprises a step of generating at least a portion of the electronic map using the probe data, the method may comprise using the movement data indicative of each of the movements of the plurality of users with respect to time in a geographic area to determine a network of one or more navigable segments in the area. The method may comprise using the movement data to determine one or more paths taken by a plurality of users in the geographic area, and generating a network of one or more navigable segments in the area. It will be appreciated that positional traces, i.e. position against time, for the plurality of users determined based on the probe data may be used to infer the likely positions of paths and hence navigable segments in the area. The method may involve clustering probe traces to determine commonly taken paths, etc.

In accordance with the invention in any of its aspects or embodiments, the received probe data may be received in any suitable manner. The data may be received via any suitable communications link. The link may be a wireless link or a wired link or may comprise combinations thereof. For example, the data may be received via the Internet or over the air. As discussed above, the data may be received directly from personal portable training devices of the users, or indirectly from such devices by retrieving previously uploaded data from a data store.

The received probe data may be received from any suitable source or sources. The received probe data comprises movement data for each user with respect to time and associated physical exertion data. The probe data for each user is received from a mobile device or devices associated with a user. The device or devices may be transported, worn or carried by the user. Thus, the movement of the device or devices may be assumed to correspond to the movement of the user.

In preferred embodiments the movement probe data is received from the location determining and tracking means of a mobile device associated with the user. The location determining and tracking means may be arranged to determine and track the location of the device. The location determining and tracking means could be of any type. For example, latitude and longitude coordinates could be determined using a device that can access and receive information from WiFi access points or cellular communication networks. Preferably, however, the location determining and tracking means comprises a global navigation satellite systems (GNSS) receiver, such as a GPS receiver, for receiving satellite signals indicating the position of the receiver (and thus user) at a particular point in time, and which receives updated position information at regular intervals. In preferred embodiments the location determining and tracking means comprises a global navigation satellite systems (GNSS) receiver, preferably a GPS receiver, and preferably a GPS chipset. Thus, in these particularly preferred embodiments, the method comprises receiving the position data from a GPS chipset of a device. In embodiments, therefore, position data is received from location determining and tracking means of a personal portable training device arranged to be transported, carried or worn by a user, and wherein the location determining and tracking means comprises a global navigation satellite systems (GNSS) receiver.

The movement data relates to the position of the user at different times, e.g. when travelling along a path. Thus the movement data includes position data for the user at different times. Accordingly the movement data may consist of a set of position data points, each data point representing the position of the user at a given time. Preferably the data comprises GPS data. In embodiments the position data may be obtained by the device at any given frequency to allow tracking of the device and hence user. In some embodiments the position data is obtained by the device at a rate of 0.5 Hz or greater, preferably at a rate of 1 Hz or greater, such as up to a rate of 20 Hz. In some embodiments the position data is received by the device at a rate of 1 Hz. Accordingly, in embodiments, the position data may relate to the position of a user at time intervals of less than or equal to 2 seconds, or less than or equal to 1 second, such as up to 0.05 s. In embodiments the received movement data comprises position data is associated with time information i.e. identifying the time to which the position data relates. The time information may be in the form of a timestamp.

The movement data is indicative of the movements of the user with respect to time. The movement data is indicative at least of the position of the user with respect to time. The position may be a two dimensional position. However, in preferred embodiments the movement data further comprises elevation data indicative of the elevation of the user with respect to time. Thus the position is preferably a three dimensional position. Thus the movement data preferably includes at least longitudinal and latitude data, and may include elevation data. Elevation data may be obtained in a similar manner to longitudinal and latitude position data from a GPS chipset of a device, or from a separate sensor, such as a barometric sensor of the device. The steps of the method may be carried out using two or three dimensional position data as desired.

The device from which the movement data is received may be of any suitable type. In preferred embodiments the device is a mobile device that is arranged to be transported, carried or worn by a user. Preferably the mobile device does not include navigation functionality as found in vehicle PNDs. For example, preferably the device does not include map data stored within a memory of the device or processing means that can use map data to determine a route between a first location (or "origin") and a second location (or "destination") and provide suitable navigation (or guidance) instructions.

In some preferred embodiments, the mobile device is arranged to be carried by a user as he or she travels from one location to another. The mobile device can be arranged so as to be carried by the user, such as being attached to the user's arm or wrist, or simply by being placed in a pocket or other suitable receptacle (e.g. a specially designed holder or case). In other embodiments, the mobile device can be arranged so as to be transported by a user. For example, the mobile device can be attached to a vehicle being used by the user, e.g. a bicycle, canoe, kayak or other similar vehicle. The mobile device could also be attached to an object being pushed or pulled by a user, such as a child-carrying buggy. Such mobile devices are commonly referred to as portable personal training devices. Thus, in particularly preferred embodiments, the mobile device is a portable personal training device. In some preferred embodiments, the mobile device is a sports watch. Exemplary mobile devices from which data may be received in accordance with the present invention are described in the International (PCT) application no. PCT/EP2011/054686, filed on 28 Mar. 2011, and published as WO 2012/045483; the entire contents of which is incorporated herein by reference.

The movement data received relates to the travel of a user along a path. It will be appreciated the term "path" herein refers to any journey or movement made by a user along one or more navigable segments, and does not imply that the user has followed a pre-planned route.

The user probe data additionally comprises physical exertion data. The physical exertion data is indicative of one or more measures of the physical exertion of the user and is associated with the movement data. The physical exertion data is preferably obtained from a sensor or sensors associated with a mobile device from which the movement data is obtained, e.g. from a portable personal training device. The sensors may be one or more "external" sensors operably connected to the mobile device and which are located outside a main housing of the device, or may be located within a main housing of the device. In other embodiments, the physical exertion data may be obtained from a separate mobile device or devices associated with a user. For example, a heart rate sensor (or other type of sensor) may be provided in a glove, or attached to a wristband, chest strap or similar.

The physical exertion data is associated with the movement data. Thus, the physical exertion data is indicative of the physical exertion data when performing a given movement, e.g. at a given time and position as indicated by the movement data. This enables the relatively difficulty of traversing the segment to be determined for that user. The physical exertion data may be associated with the movement data in any suitable manner which allows it to be linked to the relevant movement data. In embodiments in which the physical exertion data is obtained from a separate device to the movement data, the data may be associated with the movement data, e.g. at a central server.

The physical exertion data may be indicative of any measure or measures of a physical activity intensity of the user. Measures may be based upon any or all of: a heart rate of the user, pulse, blood oxygen content, Borg Rating of Perceived Exertion, $CO_2$ blood saturation, VO2 max value, etc. In preferred embodiments the physical exertion data is indicative of at least a heart rate of the user. The heart rate might be a maximal heart rate or any other heart rate value. The physical exertion data is preferably obtained using a heart rate sensor associated with the user. The heart rate sensor is, in embodiments, associated with, e.g. operably connected to, a mobile device that provides the movement data e.g. the portable personal training device of the user.

In accordance with the invention, the received probe data from each user is processed using an ability profile for the user. The ability profile is an individual profile for the user indicative of the ability of the user to traverse the one or more navigable segments. The ability profile may be generic to all navigable segments of the electronic map or may be dependent upon the navigable segment. For example, the profile may vary dependent upon a category of a navigable segment, e.g. whether uphill, likely to be muddy, etc, taking into account the individual difficulties of a user in traversing different segment types. The ability profile may be a function of one or more factors affecting the ability of the individual to traverse a navigable segment or segments. The ability profile may be a function of one or more of: a fitness level of the user, an experience level of the user, an agility level of the user, a stamina level of the user, physical characteristics of the user, and an equipment type of the user where applicable. Preferably the ability profile is a function of at least a fitness level of a user. Thus, in embodiments, the ability profile may be an ability profile. While the term "fitness profile" may be used herein, it will be appreciated that, unless the context demands otherwise, the term may be replaced by the broader term "ability profile".

The ability profile data for individual users is used in processing the probe data obtained from the users to enable the cost data for traversing a given navigable segment or segments to be generated. The use of the ability profile data provides a way of compensating for individual differences in difficulty in traversing a segment as indicated by the probe data to enable global cost data to be determined for a segment based upon the probe data obtained from different users when traversing the segment. For example, a user with a higher fitness level, more suitable equipment and/or greater experience, may be able to traverse a given navigable segment with lower levels of exertion than might another with lower fitness levels, lower experience levels and/or less appropriate equipment. By taking into account an ability profile of the different users, the probe data from multiple users may be appropriately scaled to provide comparable data that can then be used in providing normalized cost data, e.g. via a suitable averaging process. In other words, the ability profile data enables the probe data obtained from different users in relation to the traversal of a given navigable segment to be compared, and thus used in deriving normalized cost data for the segment.

The method may comprise using the ability profile to adjust, e.g. scale, the probe data associated with the movement data for the or each user for use in generating the cost data. The method may comprise receiving probe data comprising movement data relating to the movement along a given navigable segment and associated physical exertion data for each of a plurality of users, and processing at least the physical exertion data of the users using the ability profile for each user. The method may further comprise using the processed probe data in generating a normalized cost for traversing the segment. In embodiments the movement probe data may alternatively or additionally be processed using the ability profiles of the users. While the physical exertion data will be directly influenced by the individual ability of a user, the movement data may also be so influenced. For example, a speed of travel, rate of climb, etc as indicated by the movement data will be influenced by the user's ability and may similarly be adjusted, e.g. scaled, to compensate for such individual differences to enable its uses in determining normalized cost data.

The ability profile data may be obtained in any suitable manner. The ability profile is preferably a predetermined ability profile. In some embodiments the ability profile data is based at least partially on data provided by the or each user. For example the user may be invited to answer a series of questions to establish an ability profile. Alternatively or additionally the profile may be based upon sensed data, e.g. relating to the user's historic performance, etc. The ability profile data is preferably obtained from the device associated with the user that provides the movement data, and preferably from a personal portable training device of the user.

References to an "ability profile" or "fitness profile" herein may be replaced by references to data indicative of the respective profile.

The method preferably comprises the step of generating the normalized cost data for one or more navigable segments of the electronic map. The method comprises using the processed probe data, i.e. the probe data processed using the ability profile data, to determine the cost data. The normalized cost data is data that may be used in generating a route across the electronic map comprising the segment or segments. The concept of a cost associated with the traversal of a navigable segment is known, for example, in the context of navigating road segments. The cost is indicative of the difficulty of (or energy expended in) traversing the navigable segment. The present invention allows cost data to be reliably obtained for navigable segments in relation to their traversal by users under their own power, in particular where the segments are off-road segments. The cost data generated herein is indicative of a difficulty of traversing the given navigable segment by a user at least partially under their own power. The cost data may be generated using at least the processed The cost data is normalized in that it allows the relative cost associated with traversing different navigable segments to be determined, i.e. the costs associated with different segments to be compared. The normalized cost data for each navigable segment may be by reference to a given scale of cost. For example, each navigable segment may be assigned a cost level according to a given scale, e.g. of 1-10 or similar, i.e. one having a predefined number of levels. The cost data provides a way of globally comparing the difficulty associated with traversing different segments.

The normalized cost data for a navigable segment may be determined using the processed probe data and ability profile data in any suitable manner. The cost data may be a function of multiple factors including attributes associated with the segment and/or determined based on the processed probe data.

The method preferably involves using at least physical exertion data relating to the travel of each of a plurality of users along the navigable segment that has been processed using the ability profiles for the respective users to determine the cost data, and preferably further comprises using the movement data, preferably wherein the movement data has been processed using the ability profiles.

The movement probe data may be used directly in determining the cost data, or data derived from the movement data may be used in determining the cost data. In some embodiments in which the movement data comprises elevation data the method may comprise using elevation data in generating the cost associated with traversing a segment. The elevation data may be used to determine an elevation change that is used in generating a cost, for example. Alternatively or additionally speed data determined using the movement probe data may be used. Of course, other data may additionally be used in determining the cost. The data may comprise attributes of the navigable segment e.g. roughness, curvature, segment length etc. Such data may be associated with the segment in an electronic map, and/or may be determined using the movement probe data. The data used in determining the cost associated with traversing a segment may therefore be known data, or data that is determined using the probe data.

In preferred embodiments the cost data is determined using a machine learning process. The machine learning process may use a neural network. The system of the invention may therefore comprise a machine learning system, preferably a neural network, for determining cost data. Of course, other techniques may alternatively or additionally be used. The method may, in general, use a multivariate statistical analysis. The method may comprise using the processed probe data as an input to the machine learning process.

The method may comprise training, and optionally creating, an estimator model for creating the cost data for use in generating a route across an electronic map of navigable segments based upon the processed probe data for the plurality of users. As known in the art, the estimator model may be trained using data which is known. The trained model may then be applied to determining new data. For example, in order to train the model, input data (i.e. probe data, including movement data and physical exertion data, in respect of the traversal of a given navigable segment by a plurality of users, an agility profile for each of the users, known or desired cost data for the segment, and optionally data about the surface of the segment, weather data, etc) may be provided to the model. The input data may provided in an appropriate format for the model. By repeating this process for multiple navigable segments, the model may be trained to appropriately map the input data to the desired output cost data. The model may derive one or more parameters indicative of a relationship between the input data and the cost data. Thus, for example, one or parameters are derived such that when (determined) cost data for a segment is applied with a user's ability profile, then the time for traversing the segment and/or the energy (e.g. caloric) expenditure for traversing the segment matches that as provided in the probe data received from the user.

Once the model has been trained, new input data i.e. relating to a navigable segment for which cost data is not known, may be input to the model for determining new cost data using the one or more derived parameters. The model may be re-trained or updated as needed.

In accordance with a further aspect the invention provides a method of training a model for creating cost data for use in generating a route across an electronic map of navigable segments, e.g. as described above. The invention in this further aspect may include any or all of the features described in relation to the earlier embodiments.

The method in accordance with any of its aspects may further comprise the step of storing the generated normalized cost data for the or each navigable segment. The data may be stored in association with electronic map data indicative of the segment.

It will be appreciated that the difficulty of traversing a given segment may depend upon weather conditions or a time of year. Cost data for a given segment may be determined that is time or weather dependent using probe data collected in respect of the relevant time period or weather condition. The method preferably comprises the step of generating time and/or weather dependent normalized cost data for the one or more navigable segments of the electronic map. The relevant cost data for the time and/or conditions at which a route is to be travelled may then be used in generating a route using the cost data. In embodiments the probe data that is used in accordance with the invention is data relating to the movement of each user for a given time period and/or set of weather conditions. The method may comprise using the data to determine a time and/or weather dependent cost for traversing a navigable segment. Cost data may be determined in respect of the same navigable segment for a plurality of different times and/or sets of weather conditions, e.g. wet or dry weather, winter or summer, etc.

Thus, in embodiments, the method further comprises obtaining at least one of: surface type for at least a portion of the path traversed by a user (and for which probe data is obtained); historic (e.g. the past week, day, hours, etc) and current weather conditions for the geographic area traversed by a user (and for which probe data is obtained).

The generated normalized cost data may be used in various manners. In some embodiments the method further comprises using the normalized cost data to provide a suggested route to a user. Preferably the suggested route is based on an ability profile of the user and one or more user specified parameters. The user specified parameters may include one or more of: activity time, distance, start position (or "origin"), end position (or "destination"), segment (i.e. surface) type, and level of physical exertion. An appropriate level of difficulty of a route that can be traversed by a user can be established using the ability profile of the user and one or more of the user specified parameters, with the cost data then being used to determine a route meeting the difficulty criteria and any required user specified parameters. The route may comprise a set of one or more navigable segments of the electronic map for which cost data has been determined. The route is preferably a trail, i.e. an off-road route. The method may further comprise providing a set of navigation instructions guiding a user along the suggested route.

In embodiments in which the time and/or weather dependent cost data is determined, the method may comprise providing a suggested route to a user using cost data in respect of a time period and/or weather condition corresponding to a current time or weather condition, or a time or expected weather condition applicable at the time when the route is to be travelled. In some embodiments in which the current weather condition or expected weather condition is not known, weather dependent cost data may be selected for use in determining the route based on historical weather conditions. For example, appropriate cost data for weather conditions expected based on historic weather conditions for the given time, e.g. of day, month and/or year may be used.

In accordance with the invention in any of its aspects or embodiments, preferably the steps of receiving the probe data and determining the normalized routing costs are carried out by a central server. The system of the present invention may comprise a central server arranged to perform any or all of the steps referred to herein. The received data may be received directly or indirectly from a device.

As mentioned above, references to a "trail" herein should be understood to refer to a path comprising one or more off-road navigable segments.

According to a further aspect of the invention, there is provided a method for determining a route to take along a trail system comprising:

acquiring input parameters from at least one participant for a trail activity, the input parameters comprising: a starting location and ending location; a type of trail activity; selection of a routable trail network database which supports the type of trail activity to be performed; a participant profile of at least one participant for the type of trail activity to be performed; at least one of a requested traversal time of the route and the requested energy consumption to traverse the route; and a maximum level of exertion to traverse the route;

determining routing costs associated with potential route segments as a function of the input parameters, the participant profile and the at least one of traversal time, energy consumption and maximum level of exertion, and the routable trail network database; and calculating one or more optimal routes, when feasible, made up of connected route segments from the selected trail network, said optimal routes that are nearest to complying with at least one of the selected requested traversal time, requested energy consumption and maximum level of exertion.

The participant profile may include indexes for fitness, agility and stamina for a given trail activity.

The at least one participant may comprise two or more co-participants and where the calculated one or more optimal routes is calculated based on at least one of a greatest traversal time, a greatest energy consumption and greatest level of exertion among the participants for the trail activity to be performed who are physically capable of traversing the route.

A potential route may not be considered should the calculated energy consumption for the participant intending to traverse the potential route exceeds a maximum value for the participant.

According to another aspect of the invention, there is provided a method to develop a trail routing map database for a plurality of trail usages and specific to the abilities of a participant or group of participants comprising:

identifying one or more trail usages;

collecting sensor data associated with the traversal of trail segments for a given trail usage and trail system;

collecting baseline participant entered input;

collecting participant entered data during trail traversal;

mapping the trail system in 3D dimensions based on sensors associated with trail segment geography and characteristics;

developing routing cost model associated with trail segments based on at least one of: the sensor inputs during trail traversal; direct participant entered base line and data entered during trail traversal; and the map of the trail segments traversed.

The trail usages may comprise one or more of: running, hiking, boating, biking, skiing, snowshoeing, bridle, snowmobile, and motorcycle.

The sensor data may comprise at least one of the following: trail segment geography and characteristics; environmental conditions in the vicinity of the trail system; and participant's bodily functions.

The trail segment geography and characteristics may include at least one of latitude, longitude and elevation at intervals along the segment.

The environmental conditions may comprise at least one of real-time weather and historical weather information.

The participant's bodily functions while traversing a segment may include at least one of heart rate, pulse oximetry, body temperature, and acceleration (pref. in 3-component) at intervals along a segment.

The baseline participant entered input is a measure of at least one of the following: the participant's physical characteristics; and the characteristics of equipment used.

The participant data entered during trail traversal may include at least one of: hydration information, caloric intake, and equipment status.

The participants physical characteristics may include at least one of: gender, age, resting and maximal heart rate, V02 Max, blood oxygen content, Borg Rating of Perceived Exertion, and $CO_2$ blood saturation.

The developing of the routing cost model may be performed using multivariate statistical analysis and/or machine learning techniques.

Principal component analysis may be performed on the routing cost model such that inputs which have little or no effect on the outcome of the model are eliminated from the model, and the model is subsequently recalculated.

The routing costs may be associated with indexes of participants fitness, stamina, and agility and a participant's physical characteristics.

According to another aspect of the invention, there is provided a method of establishing a fitness profile of a participant for a given trail activity comprising:

collecting sensor input which measure bodily functions during varying levels of exertion over known trails segments with known geometry and known routing costs associated with the sensor types being collected;

collecting direct participant entered input with respect to at least one of the following: the participant's physical characteristics, the presumed level of exertion during trail traversal, energy consumption during the trail traversal, and the characteristics of equipment used;

creating a fitness profile using machine learning techniques to develop a functional relationship between the sensor inputs and participant entered input and the routing costs of the routes taken.

According to another aspect of the invention, there is provided a routable trail map database used in a navigation device comprising: trail segment geometry, elevation, associated routing costs, and metadata; wherein routing costs for a given trail activity incorporate: an indication of user's agility, fitness and stamina for a given trail usage; and an indication of exertion in the form of energy consumption that is required to traverse a trail segment in a given direction.

The routing costs for a given trail activity may be expressed as a polynomial function used to predict at least one of participant traversal time and energy expenditure, wherein the variables of the polynomial function include at least one of: parameters indicative of the trail segment geometry; environmental factors; indexes indicative of participant, agility and stamina for a given trail usage, and wherein the multiplicative constants applied to the variables are weighting functions determined based on multivariate analysis of sensor measurement by a plurality of participants traversing the trail segments.

The at least one sensor measurement may be taken from the list of: heart rate monitor; pulse oximeter; resting heart rate; and oxygen content of the blood.

The parameters indicative of trail geography include at least one of: average slope; maximum slope; elevation gain; average curvature; roughness; elevation loss; trail length; trail length up; and trail length down.

According to another aspect of the invention, there is provided a method of maintaining a trail map database and associated routing costs wherein metadata associated with the routing costs and geography of the trail system comprises: the currency of the input data used to create the geography and routing costs; and the validity of the predictions for travel time and energy consumption for trail traversal, wherein the geometry or routing costs are updated when the quality falls below a threshold by:

incorporating new sensor input and indices into the determination of the routing costs and trail segment geography;

removing data that is older than a selected threshold age from the determination of the routing cost and trail segment geography;

updating the geometry of maps when a plurality of participants deviate from the stored geometry for a given trail segment;

utilizing principal component analysis to remove sensor input to the routing costs functions that has minimal impact; and adding new sensor input to the routing costs which positively impact the quality of prediction.

According to another aspect of the invention, there is provided a method of determining the influence of equipment or technique during trail activity comprising:

developing a personal fitness profile for a single participant or small group of participants;

developing trail routing costs for trail segments using the fitness profile for the single participant;

incorporate new input on techniques or equipment into the multivariate analysis; and identify the influence that the new input exerts on the analysis.

According to another aspect of the invention, there is provided a method of providing route directions to a participant of a trail activity using a navigation device comprising:

determination of a route using the above described method;

starting the route;

monitoring the elapsed time along the route and the participant's vital signs;

apprising the participant using one of voice commands or graphic display during trail traversal of at least one of: turn directions; level of exertion; deviation from the at least one of travel time predicted and energy consumption predicted during the route; warning if the stamina level will be exceeded if the route is completed; reminder to hydrate or consume calories; elapsed time; and time to finish.

According to an aspect of the invention, there is provided a trail navigation and routing apparatus comprising:

a processor loaded with software to perform any of the above described methods;

a memory containing a routable map database;

sensors that can measure at least one of location, elevation, heart rate, pulse oximetry, body temperature, acceleration, and speed and that can communicate those readings to the processor; and an output device to communicate directions and statistics to a users of the apparatus.

In some aspects or embodiments at least, the present invention may provide a method and apparatus to create, and maintain a digital trail map that is routable that would enable a participant to determine a route to take for a trail system unknown to the participant for a selected type of activity where the selected route would be traversable for a given energy expenditure at a certain level of effort and/or in a given amount of time or where an accurate traversal time and/or energy expenditure could be estimated going from a starting point to a destination along the trail system.

Examples of trail usage are, among other things, recreation or commuting and sports training. Trail systems are typically used by pedestrian, hikers or runners or for non-motorized vehicles such as bicycles, or skis and motorized vehicles such as ATVs (all-terrain-vehicles), snowmobiles and dirt motorcycles. Water routes including canoeing and kayaking routes are also included. This class of transportation system has unique routing costs associated with it that not only involves aspects of the trail system, but also physical traits of the user of the trail system and aspects of the equipment used on the trail and also weather. Weather is especially important for non-motorized activity as it has a significant impact on travel-time, such as headwind when running on a road.

In some aspects or embodiments at least the invention may provide the ability to track a participant's fitness and agility for given trail activities and include these parameters as part of the routing cost used to determine a route to take. Determining and updating routing costs including: energy expenditure to navigate a trail segment, effect of environmental factors, such as weather, on that energy expenditure, and participant personal fitness and agility, are determined and updated using multivariate or machine learning analysis.

In some aspects or embodiments at least the invention may involve using a variety of sensor information such as accelerometers, GPS probe traces, heart-rate monitors, pulse oximeters and others and evaluating each input's statistical correlation and relevance and weighting factors for their usage in updating routing costs.

In some aspects or embodiments at least the invention may provide an apparatus to allow a participant to plan a trail route; to assist in trail mapping and ranking; and to be used as a training device and to provide trail guidance is part of this invention. The apparatus is further configured with sensors such as a GPS, heart-rate monitor and pulse oximeter. The apparatus can log these inputs and upload to a central server.

In some aspects or embodiments at least the invention may assist in competition between a participant and a virtual competitor or another actual competitor and to handicap competitors based on agility and fitness profiles In some aspects or embodiments at least the invention may provide a uniform system to develop routing cost data for many trail uses and for different trail systems and for different individuals. This enables individual users to be able to use a different trail system that they previous have no experience with and pick a route for recreation, commuting or sports training that will provide them with a realistic travel time or caloric expenditure and a selection of routing that does not exceed the participants technical ability or desired level of effort. To come up with a routable trail map, aspects of probe processing, crowd sourcing, social networking and geographic information systems come into play. Because many trail systems change with great frequency: new trails added, trails are rerouted, trails degrade over time and improvements are made to the trail, the map and the routing costs are always changing, the mapping/routing system has to be dynamic. Likewise an individual's fitness level, any injuries an individual may be carrying, and an individual's technical skill level are all dynamic as well.

In some aspects or embodiments at least the invention may provide a system to evaluate the effect of equipment on performance of a competitor.

In some aspects or embodiments at least the invention may provide route selection further based on collective profiles of a group of participants that are using the same trail simultaneously.

In some aspects or embodiments at least the invention may allow track historic routes taken by participants to be tracked and to incorporate this knowledge into new suggested routes for that participant so as to not duplicate former routes.

In some aspects or embodiments at least, a system and apparatus is presented that is designed to map, route and maintain a routable digital map database for trails usage (land or water): the trails being for fitness or commuting and generally a human propelled vehicle or simply a pedestrian hiker or walker. The apparatus comprises a distributed network of personal navigation devices connected periodically to a central processing facility which collates and redistributes information. Routing cost (traversal time and/or participant exertion) comprises weather and human factors. As this invention can be used for human powered vehicles or pedestrians, the cost of performing a route is highly tied to the ability of the pedestrian or operator of the human power vehicle. In order to adequately determine the time and/or energy output to traverse a trail (or other routing cost) for a trail system, it is necessary to be able to rank participants ability when compared to others.

Advantages of these embodiments are set out hereafter, and further details and features of each of these embodiments are defined in the accompanying dependent claims and elsewhere in the following detailed description.

BRIEF DESCRIPTION OF THE DRAWINGS

Various aspects of the teachings of the present invention, and arrangements embodying those teachings, will hereafter be described by way of illustrative example with reference to the accompanying drawings, in which.

DETAILED DESCRIPTION OF THE PREFERRED EMBODIMENTS

Figure 1B:
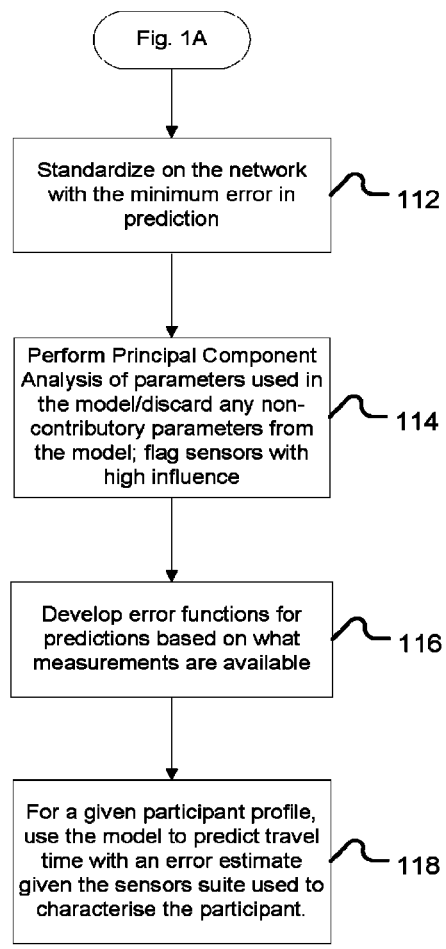
FIG. 1, consisting of FIGS. 1A and 1B, shows how an embodiment where artificial neural network model is used to develop routing costs for trail routing.

As described above, in its preferred embodiments at least, the present invention relates to determining costs associated with navigable segments that are off-road segments, and which costs may be used in generating routes through a network of such segments. For example, the routes may be in the form of trails through the network of off-road navigable segments. A trail as used herein refers to a path comprising one or more off-road navigable segments. The segments making up the trail may be referred to as "trail segments". While the preferred embodiments will be illustrated by reference to trails and off-road navigable segments, it will be appreciated that the invention is applicable to other types of navigable segments and paths through a network of navigable segments, which may or may not be off-road segments.

Some fundamental differences of routing for trails, i.e. paths comprising off-road navigable segments as opposed to paths through a vehicular road network are: aspects of the participant fitness and skill have to be taken into account; equipment may matter substantially; environmental conditions such as weather matter more and the direction of travel matters due to the effects of gravity and friction and weather.

In embodiments it is desired to estimate the travel time to traverse a trail segment or group of trail segments for a given participant. The traversal time will be a function of an individual participant's physical condition, stamina, level of effort, and previous activity prior to traversal.

Agility, or how skilled a participant is at performing a particular trail activity, will influence the amount of energy required to traverse a trail as well as the mass of the participant and the fitness of the participant. A less skilled participant may require addition energy output, or may not be able to traverse a trail that requires more skill than the individual has. Energy output required by a participant to traverse a trail is primarily a function of gravity and friction, but is also influenced by the agility of the participant. However, trails are not constant and the weather will greatly influence friction. The stamina of a participant is also important. If a trail segment is traversed towards the end of an arduous workout, the participant's agility could be less and the level of stamina may go down.

If you know: the energy required to traverse a trail; the fitness and agility of a participant; how the weather influences this energy requirement to traverse the trail; and the weather effect on the ability of the participant, then the time required to traverse a trail and the energy output needed can be predicted. Finally, a participant may not want to maximize an effort to traverse a trail, so not only the type of trail activity must be considered, but the level of effort, for example recreational, training, or racing which could be defined, for example, as a percent of maximum heart rate.

It is desired is to derive and maintain a routable trail database and enable use of that database for routing and sports training and equipment evaluation. The factors needed to predict traversal time and caloric burn, based on predetermined route costs for a given activity, can be broken down as follows:

Participant Ability: Level of Effort (recreation, training, racing); Fitness; Strength; Agility; Endurance (or Stamina); Modifiers—Weather (real-time, historical), Equipment, Hydration, Caloric input Trail segment degree of difficulty: Energy expenditure; Agility Agility is used herein to mean a participant's skill at the particular activity. If you are an expert at a particular sport, you may be able to use less energy to traverse a trail, than another participant that is equally fit but less skilled. Likewise, if you have better equipment that allows you to perform better, then this would affect an agility rating.

Initial values and changes to the map and routing costs can be "learned" by applying multivariate analysis to observations of sensor measurements of the trail system and individual traits and the weather.

Due to the different trail uses, the significant amount of trail systems that exist, and the lack of any commerce occurring on most trail systems, the mapping of the trail systems and determination of routing costs will usually be crowd sourced meaning that sensor data will be uploaded to a central repository and a map and routing costs derived either automatically and/or manually from the probe traces. This has been enabled by the common usage of personal navigation system and smartphone applications and a shown willingness of sporting participants to upload information and compare statistics with one another. The present invention in its embodiments involving the determination of a cost associated with navigable segments may or may not involve the initial mapping of the network of segments. In some arrangements, the navigable segments, e.g. trail segments, of the system may already be mapped, and the method may use a pre-existing electronic map of trail segments.

There is also an aspect of directionality for routing cost on a trail system—gravity and friction play a significant factor for human powered activities and also for machine performance on a trail system. In order to accurately predict the transit time for a route, it is vital to have a uniform rating system for the degree of difficulty for individual trail segments and the fitness, endurance and agility of the participant. These costs cannot be measured directly in most cases and therefore, they must be inferred from input either by direct observation and assessment (tends to be subjective) and sensor measurement. Consequently the rating system must be defined universally and be able to cover the extremes of fitness and difficulty. An example of a ranking system for an activity is the rating system for white water kayaking where sections of the river are rated from I to V where class V implies that to fall out of the boat and being forced to swim is potentially life threatening. This system although highly useful, is limited due to its empirical nature. Not to mention, the class will change based on how much water is coming down a particular portion of the river. Likewise this system does not have enough precision if things like equipment evaluation are to be performed. There would have to have an order of magnitude more precision such as class 1-50 instead of class I-V. The rating system for a trail may ideally span "any one can do it" to "no one can do it". The rating system for a person may ideally span no effort to impossible effort; no agility to unobtainable agility.

Because sensors that are currently available are attached to a participant or at least to the equipment of the participant, you cannot divorce the observer from the experiment, meaning if you are trying to measure the degree of difficulty for a trail segment, the fitness and agility level of the participant will affect the measurements. In addition the endurance of a participant is also important. Fitness level may go down during an extended outing if endurance is low.

Trail specific (energy expenditure (or fitness) and agility) routing costs can all be tied to the influence of gravity and friction. One could measure friction indirectly, for example, in cycling, you could measure torque using strain gauges attached to wheel axle, however, slippage of the wheel is not only due to the slipperiness of the surface, but how the participant centres his/her weight over the rear axle. Examples of observations that can be used to determine a degree of difficulty are slope and the length of that slope. Another example would be simply record net elevation gain for a particular segment. An example of a measurement to correlate with degree of difficulty in terms of a user's agility or expertise in a particular trail activity would be changes in acceleration as monitored by accelerometers in a smartphone or other device warn by a participant. If acceleration is constantly changing in direction and orientation, this could be an indication of a bumpy surface of the trail.

The key factor here is that the user cannot be separated from the trail when making measurement and in general a degree of difficulty or a fitness and agility level cannot be measured directly or do not correlate well to a single type of measurement.

Multivariate Analysis and Machine Learning

In embodiments, a model of a complex system comprising trails, participants, weather and activity is created. As no two activities are the same, no two participants are the same, and the interactions of any two components are never the same, it is impossible to derive routing costs directly—few of the routing costs can be directly measured; and due to the dynamic nature of the process, these routing costs will constantly be changing. In addition, the factors (parameters being measured) which have a greater correlation with routing costs may be different depending on the type of trail usage. Also as the system is complex, a form of multivariate analysis may find better correlations than can be had with conventional statistical means or direct observation.

In the context of this application, multivariate analysis consists of any analysis that takes a variety of measurements or observations related to an activity and of the participants of that activity and develops a model combining the influence of these measurements or observations to predict an outcome. In this case the outcome to predict is the transit time for a given participant on a given route and/or the energy consumption to traverse the same route.

There are a variety of statistical means to perform multivariate analysis—analysis of several variables used in combination to predict an outcome. In an embodiment, an outcome is to relate the physical characteristic of the trail segment, environmental parameters and fitness and agility characteristics of several participants to the time to traverse the trail segment and the number of calories needed to traverse the segment for a given participant for a given activity.

Regardless of the statistical means used, the procedure for developing a rating system are similar and a person skilled in the art would be able to use a variety of analysis algorithms based on this narrative. In an embodiment as shown in FIG. 1, how an initial model is developed is described for a back propagation artificial neural network. The objective of the analysis is to predict for a given trail segment and given activity and given participant: travel time, energy consumption, maximum level of exertion.

The method comprises the following steps:

1. Collect Data

Measure fundamental quantitative and qualitative indicators of fitness for several participants of the same activity such as minimal and maximal heart rate, pulse oximeter readings, body mass index, height, weight, weight of equipment, and age—step 100.

Collect data for the above participants during traversal of several trail segments of varying degrees of difficulty—step 102. Examples of sensors used to collect information include GPS for geographic location and elevation, heart-rate sensors, 3-axis acceleration and pulse oximetry for a measure of oxygen content of the blood—all at intervals over time.

Collect weather and other environmental data such as precipitation, precipitation for the previous week, wind speed/direction, temperature ground cover (leaves, snow, etc) and any similar measurements that may influence the time to traverse a trail segment or the energy consumed.

Create several variations of averaged or integrated sensor measurements over the length of each segment that can be input into an artificial neural network (or similar multivariate technique)—step 104. Examples are average speed, average acceleration, peak speed, peak acceleration. Average acceleration parallel to the earth surface, both in the direction of travel and perpendicular to the direction of travel and perpendicular to the surface; net elevation gain, total elevation, elevation loss, maximum slope, average slope, average altitude; starting heart-rate, average heart rate, minimum heart rate, total heartbeats per trail segment, average blood oxygen level, maximum blood oxygen level.

Alternatively, general qualitative indexes can be created (not shown) for input into the neural network, for example the amount of calories expended to traverse a trail segment could be approximated by an index based solely on heart rate over time or solely on pulse oximetry or a combination of the two. This would allow multiple sensor types to be used to derive the same index which in turn could all be used in the method simulation as an input variable instead of the individual sensor measurements. Of course the issue is that not all sensor types are as good at indirectly measuring a specific index so this would have to be accounted for with metadata to indicate the precision the measurements used to create an index.

2. Create an Artificial Neural Network

In this embodiment, to build a back propagation neural network, training and validation datasets must be assembled from the above collected data or derivations of the data or indexes. Several combinations of inputs need to be implemented in the neural network and the quality of the resulting predictions for each configuration needs to be assessed. Care needs to be taken to limit redundant derived indexes or sensor inputs that have similar effects on the neural network outcome. For example, it may not be desirable to use both an average heart rate and an index for calories burned that is derived from heart rate in the same neural net. In terms of principal component analysis, the measurements or indexes should be orthogonal—meaning they should represent mutually exclusive parameters when possible.

Each network is trained to predict the desired output: traversal time and caloric expenditure for each segment.

3. Training and Validating the Network

A subset of inputs is selected as a training set. Initially weights are selected for each neural connection or random weights are input depending on the particular algorithm in use. The network is then iterated in a learning mode and the weights associated with each input are adjusted to optimize to prediction of the output. Next, the optimized neural net is used with the validation set and the variance between the predicted output and the measured output is quantified and a model with the minimum error of prediction is selected. Alternatively a sensor suite that has a slightly less good prediction, but yet is less expensive or more reliable to operate could be selected—steps 106-112.

A principal component analysis is performed and if any input parameters have very little influence, they can be discarded and a new neural net constructed and trained without using the discarded parameters—step 114.

Error functions are created such that if all sensors of import were not available when a particular trail segment was characterized, an estimate of the quality of prediction for that segment can be made based on the relative influence of each parameter that is being used—step 116.

Use the model for traversal time prediction and, if desired, display a measure of the quality of the prediction.

4. Determine the Level of Difficulty

Not all participants will be able to navigate every trail segment—it may be too difficult for their level of fitness or skill. Once a relationship for travel time and energy consumption is developed, it can be refined by developing a relationship to define when a trail exceeds a participants abilities. Examples of relationships to be observed is if participants never traverse a trail; if there are large accelerations in directions other than the direction of travel based on accelerometer reading or similar; if they fall a lot; and if there are frequent stops during traversal. A degree of difficulty can then be assigned to trail segments which can then be used as an addition routing cost parameter—step 118.

5. Use the Network

Once the initial neural network is created and validated, add additional trail segments and participants. When new segments or participants are added, acquire sensors measurements which then are added to the database.

6. Update the Network

Periodically perform back propagation or similar technique to adjust the weighting factors of the network and to rank new participants and trail segments.

Periodically remove older data from the database which is incorporated into the network calculations. This serves to eliminate changes in the trail system from affecting routing costs and serves to update a user profile when fitness levels change.

When new sensor types come on line, record statistically sufficient data for a trail set and recalculate a neural network using the new sensor type. Update the network with the new sensor type if justified by better prediction. Remove older sensor types that analysis shows that no longer are relevant (have little influence on predicted travel time or energy consumption or degree of difficulty). Given a quantity and variety of measurements that may or may not be related to an outcome (a routing cost for example), you can develop weighting factors for each independent variable to determine a combination of measurement that provide the best prediction and a confidence level of how good that prediction is. As more measurements are obtained, the algorithm learns how to make better predictions. As other types of measurements are obtained that are analyzed as to whether they improve the predictions of the model and if so, are incorporated into the model.

The goal of this multivariate analysis is to have several measurements (independent variables) which can be used to predict an outcome (a routing cost) and ultimately a travel time and energy consumption. The prediction takes the form of a polynomial equation where individual parameters are normalized and are multiplied by weighting factors and summed with the result being the predicted outcomes. So for a given route and participant, level of effort, weather and equipment, a time to traverse the trail, the amount of energy and the agility required to traverse the trail can be predicted. Next the prediction is compared with the actual travel time. Back propagation can then occur where the weighting factors are adjusted (as a function of how much confidence there was in the weighting factor to begin with) such that the polynomial now better predicts travel time. Confidence in the weighting factors is recorded and is a function of the precision and accuracy of the measurement and how many observations went into the determination of the weighting factor of the measurement.

It is understood that not all participant will have the same probe sensors available, nor may their fitness or agility be documented as well as other participants, nor may they want to share this data with the network. A participant could use the system for routing with no sensors by entering estimates of required input in a quantitative manner. For example a participant could be prompted for what they think their fitness level is and also enter weight and age and the system could infer a heart rate minimum and maximum.

In an embodiment a way to optimize prediction is to have multiple neural networks for different classes of participants for users of different suites of sensing devices. Then the network is optimized for the available sensor inputs for the given group.

In another embodiment, if a participant has fewer measurements to work with, say for example that no weather data is available and the participant simply has a heart-rate monitor and a GPS, once the participant has traversed a statistically significant number of trails that are well characterized, and a fitness level is established based on the time it takes to traverse several different trails, then a future travel-time can be predicted albeit with less accuracy that a full sensor/measurement suite. The accuracy, in an embodiment, can be characterized by the statistical relevance of the sensor readings available in the predictive model being used.

Map Construction

The methods of the present invention may utilize a pre-existing electronic map of navigable segments, or may involve a step of generating an electronic map.

The routing on a trail system must start with a routable map and attribution. The map is considered dynamic or constantly changing. Where it is conducted, initial map generation can be derived from one or more probe traces from personal navigation devices or smart phones or other location sensor device. The trace (a series of locations and elevation measurements and the associated time of measurement) is uploaded along with user observations concerning naming, type of feature, etc. and a navigable map is constructed using conventional means. In addition, other sensor measurements and/or calculated indices are associated with the trace are also uploaded. The location and elevation data is applied to a mean probe trace which results in a series of trail segments and nodes where one or more trail segments terminate/intersect or where there is a substantial change in routing costs—for example a steep hill.

It is known in the art how to build a routable digital map for vehicular traffic. It is also known to upload probe (GPS) traces from portable navigation devices to a central website for the purpose of construction of a digital map. Likewise strictly crowd sourced street maps are well known. For this application an initial map and further updates to the map can be performed using similar techniques to crowd source and build a vehicular routable road network.

One addition to the techniques used in constructing a map for vehicular traffic, however, is to have user assistance when building/maintaining the trail routing system whereby a user interface on a personal navigation device interactions with the user asking simple question and/or allowing a user to attribute probe traces while acquiring them. For example naming or numbering trail segments and/or confirming the name of an existing trail segment being traverse or identifying when a node is crossed. This information can go a long way to improve conflation of probe traces into an existing database or building one from scratch.

It should be noted that the overall database can be distributed over a variety of devices just so long as those devices are in communication at least intermittently and periodically. For example the trail map for one trail system need not reside on the same server as the trail map for another system. Likewise, individual user/participant profiles can reside on a personal navigation device or personal computer and for privacy reasons; statistics on the user can be uploaded periodically and anonymously (if desired).

Nodes in the trail system may also be placed at other than at the intersection of more than two segments or at a dead-end segment. Nodes may also be placed where the degree of difficulty or the fundamental routing cost changes appreciably. For example, if a portion of trail is extremely steep, then it flattens out, it may be advisable to place a node at the transition location of the slope. Likewise, if the surface transitions from payment to crushed stone, for example, this may be observed with a node.

Various combinations of manual map making, conflation of map information and/or information from probe traces can be used to make an initial map. Once the initial map is made, then the map and routing costs are continually refined with information from probe traces uploaded from users in combination with user profiles, monitoring information from the user and environmental data such as weather. Geometry from the probe traces is constantly introduced and compared to the existing database. If geometry varies greatly, then a person uploading the trace may be asked questions such as: Is this a new trial? If not, does this trace follow trace X going through a certain node and intersect trace Y? Therefore from a combination of raw data and simple question and answers, the trail network map can be continually updated.

Data Collection

It can be inferred that certain parameters will influence routing cost more than others, but artificial neural network analysis may find combinations of factors that are not obvious. When first collecting data, all commonly available sensor output should be recorded. This includes GPS probe traces (including time, location, elevation), heart-rate, and acceleration (from smartphone accelerometers).

In embodiments of the invention, positional data is obtained from portable personal training device, such as sports watches, having access to Global Positioning System (GPS) data. Such sports watches are often worn by athletes to help them during their runs or workouts, e.g. by monitoring the speed and distance of the user and providing this information to the user. It will be appreciated, however, that the device could be arranged to be carried by a user or connected or "docked" in a known manner to a vehicle such as a bicycle, kayak, or the like.

Figure 2:
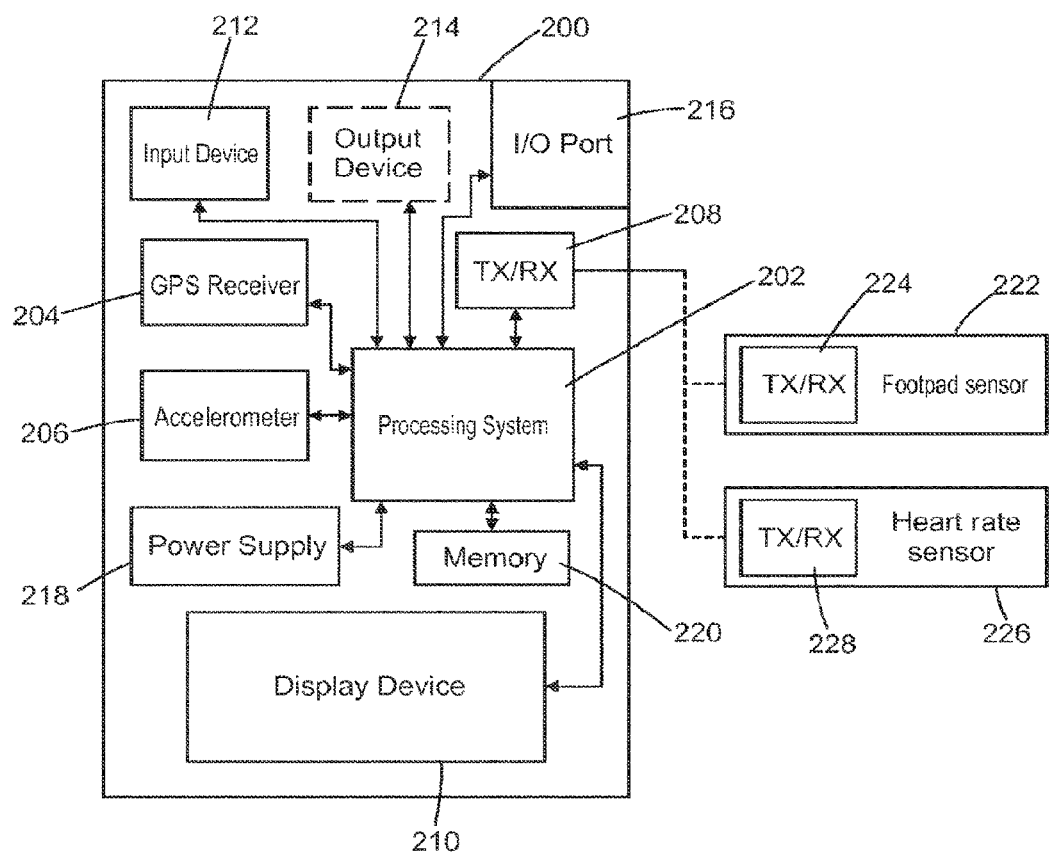
FIG. 2 is a schematic illustration of electronic components arranged to provide a portable personal training device.

FIG. 2 is an illustrative representation of electronic components of a personal portable training device 200 according to a preferred embodiment of the present invention, in block component format. It should be noted that the block diagram of the device 200 is not inclusive of all components of the navigation device, but is only representative of many example components.

Figure 3:
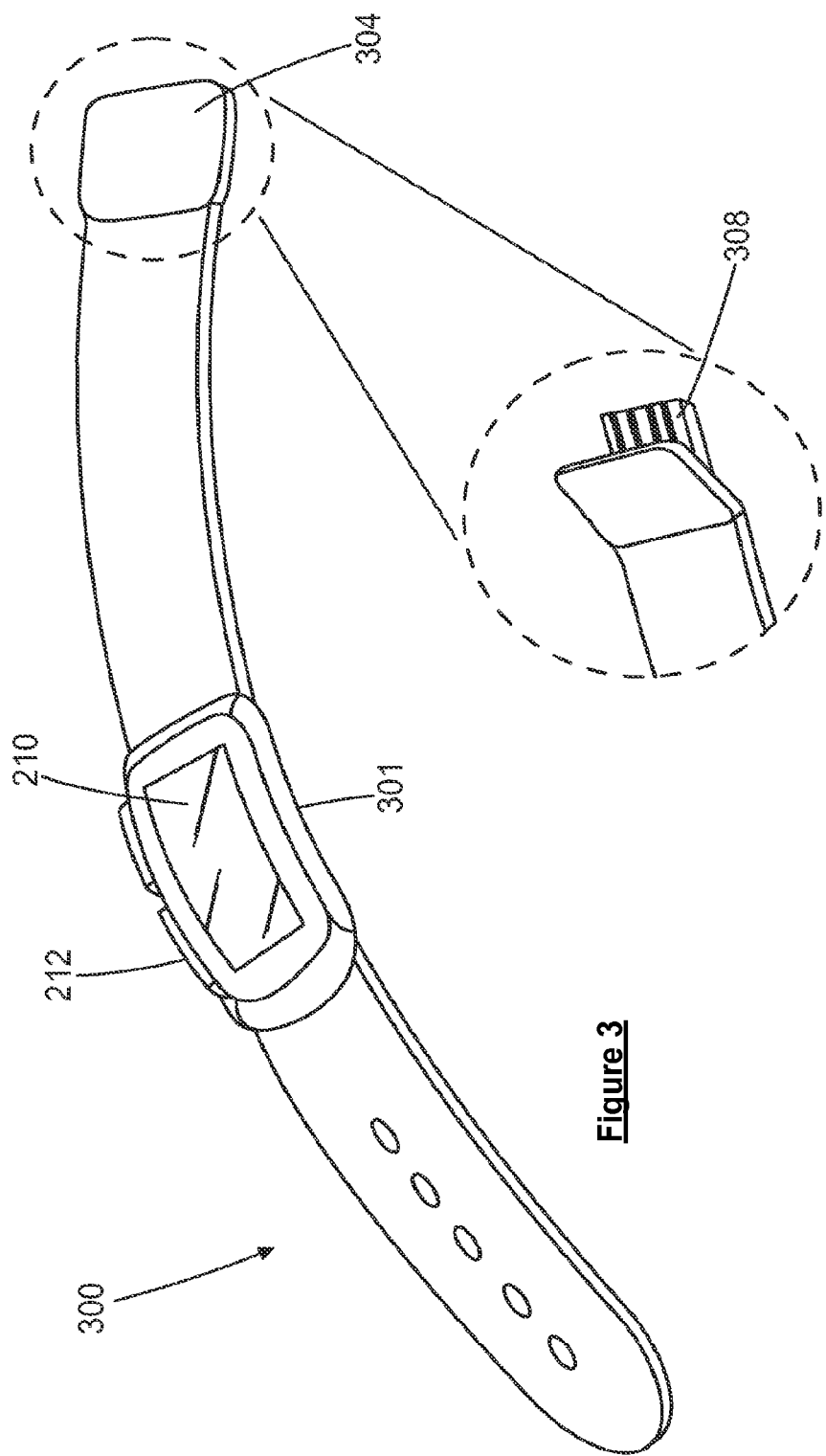
FIG. 3 shows an embodiment of the device of FIG. 2, wherein the device is in the form of a sports watch.

The device 200 includes a processor 202 connected to an input device 212 and a display screen 210, such as an LCD display. The input device 212 can include one or more buttons or switches (e.g. as shown in FIG. 3). The device 200 can further include an output device arranged to provide audible information to a user, such as alerts that a certain speed has been reached or a certain distance has been travelled. FIG. 2 further illustrates an operative connection between the processor 202 and a GPS antenna/receiver 204. Although the antenna and receiver are combined schematically for illustration, the antenna and receiver may be separately located components. The antenna may be a GPS patch antenna or helical antenna for example.

The device 200 further includes an accelerometer 206, which can be a 3-axis accelerometer arranged to detect accelerations of the user in x, y and z directions. The accelerometer may play a dual role: firstly as a means for determining a motion state of the wearer at a particular moment in time, and secondly as a pedometer for use when/if there is a loss of GPS reception. Although the accelerometer is shown to be located within the device, the accelerometer may also be a external sensor worn or carried by the user, and which transmits data to the device 200 via the transmitter/receiver 208.

The device may also receive data from other sensors, such as a footpad sensor 222 or a heart rate sensor 226. The footpad sensor may, for example, be a piezoelectric accelerometer that is located in or on the sole of the user's shoe. Each external sensor is provided with a transmitter and receiver, 224 and 228 respectively, which can be used to send or receiver data to the device 200 via the transmitter/receiver 208.

The processor 202 is operatively coupled to a memory 220. The memory resource 220 may comprise, for example, a volatile memory, such as a Random Access Memory (RAM), and/or a non-volatile memory, for example a digital memory, such as a flash memory. The memory resource 220 may be removable. As discussed in more detail below, the memory resource 220 is also operatively coupled to the GPS receiver 204, the accelerometer 206 and the transmitter/receiver 208 for storing data obtained from these sensors and devices.

Further, it will be understood by one of ordinary skill in the art that the electronic components shown in FIG. 2 are powered by a power source 218 in a conventional manner. The power source 218 may be a rechargeable battery.

The device 200 further includes an input/output (I/O) device 216, such as a USB connector. The I/O device 216 is operatively coupled to the processor, and also at least to the memory 220 and power supply 218. The I/O device 216 is used, for example, to: update firmware of processor 220, sensors, etc; transfer data stored on the memory 220 to an external computing resource, such as a personal computer or a remote server; and recharge the power supply 218 of the device 200. Data could, in other embodiments, also be sent or received by the device 200 over the air using any suitable mobile telecommunication means.

As will be understood by one of ordinary skill in the art, different configurations of the components shown in FIG. 2 are considered to be within the scope of the present application. For example, the components shown in FIG. 2 may be in communication with one another via wired and/or wireless connections and the like.

FIG. 3 illustrates a preferred embodiment of the device 200, wherein the device 200 is provided in the form of a watch 300. The watch 300 has a housing 301 in which is contained the various electronic components on the device as discussed above. Two buttons 212 are provided on the side of the housing 301 to allow the user to input data to the device, e.g. to navigation a menu structure shown on the display 210. Any number of buttons, or other types of input means, can alternatively be used as desired.

The watch 300 has a strap 302 for securing the device to a user's wrist. As can be seen the end of the strap 302 has a hinged cover 304 that can be lifted up, e.g. as shown in FIG. 3, to reveal a USB connector 308. The connector can be inserted into any suitable USB port for power and/or data transfer.

User Fitness and Agility Initial Determination

The following provides an example of the way in which an ability, e.g. fitness, profile may be derived for a user.

In one embodiment it can be assumed for initial user profiling that fitness can be measured for all activities by simple aerobic fitness and further limited to heart-rate monitoring which is a fair predictor of aerobic fitness.

A basic embodiment of the invention is described here. It is assumed that a trail system is mapped in 3 dimensions, both latitude and longitude and elevation. The map is defined by at least segments between trail intersections and nodes at the intersections. Base line fitness measurements are made of at least one participant which include body mass index, resting and maximal heart rate weight, height, gender, and age. The heart rate and time and location of the at least one participant is continually monitored while the trail network is being traversed. With only the heart rate monitor, the baseline participant physical parameters and the geometry of the trail system, a routing model is constructed using the method previously described.

Aerobic fitness is generally presumed to be best represented by Maximal Oxygen Uptake (VO2 Max). One indirect method to measure VO2 Max is by comparing the heart rate at rest to the maximum heart rate, but direct oxygen uptake measurement may be feasible in the future. Heart rate (or pulse) is also an imprecise predictor of physical strength and more particularly, physical strength of certain muscle groups. Strength may be more important than aerobic fitness for certain types of trail activities.

The result is new type of sensor measurements may be available in the future, in which case a quantity of the these measurements would need to be taken for a variety of participants and a variety of trail segments and a new learning session ensued to see if the new sensor enhances the prediction and/or can replace other sensors measurements without degradation of prediction variance. For now, a participant needs to define a resting pulse and a maximal pulse. These can be measured directly in a stress test environment or could be estimated via the Karvonen method or other method known in the art.

As it is anticipated that serious athletic competitors will want to evaluate training regiments or equipment, the rating system will have to be both accurate and precise as possible.

A measure of arterial oxygen saturation by pulse oximeter is a sensor of particular interest as this in combination with pulse rate could be a valuable predictor of participant fitness. It is a further object of this invention to have a pulse oximeter sensor embedded in a glove to keep the sensor firmly against a fingertip with the glove further protecting either a hardwire to a wrist receiver or a Bluetooth or similar wireless transceiver which relays pulse oximetry to a recorder. Yet another embodiment is to have a chest strap harness which contains a regional pulse oximeter sensor singly or in combination with a heart rate sensor. Other useful measurements include things such as $CO_2$ blood saturation.

Likewise a user can estimate their fitness/agility level based on their fitness/agility compared to others. Alternatively the method could adapt the Borg Rating of Perceived Exertion. The Borg Rating however is a minimum and maximum exertion level for an individual and is not relative between participants. Therefore it would need to be translated to heart rate which for the Borg Rating is determined. There are various means to estimating the heart rate for various amounts of exertion and a person's age.

Figure 4:
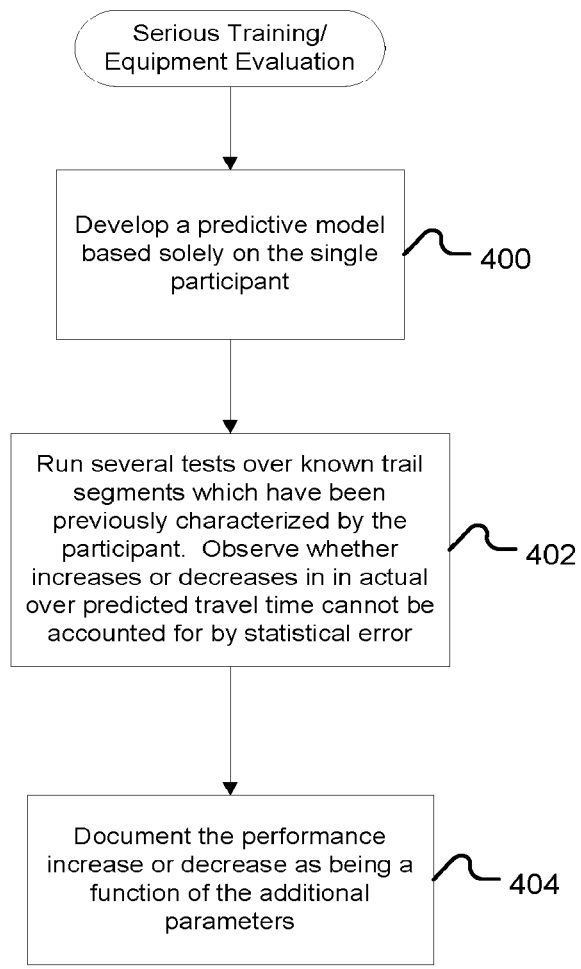
FIG. 4 describes the process when the effect of addition parameters is to be evaluated.

Training athletes or equipment evaluators singly or in groups may wish to devise their own multivariate analyses so they can observe subtle differences in energy expenditure that are a function of equipment or technique (FIG. 4). So these groups or individuals may choose to include only trails segment in a study that are highly characterized with lots of probe traces and participant records and to build up a database of additional measurements and observations with respect to these highly measured trails. An example for biking would be to monitor, type of bike, tire pressure, tread pattern, shock pressure, seat position, then perform personal evaluation of the results to determine the effect on energy efficiency. Likewise a road biker may monitor pedal cadence, put this in the network and observe the effect on energy efficiency; if a participant stops and eats at intervals or not; if a person has drunk a certain amount of water. If the neural network, prior to incorporating these factors, is a good predictor of energy consumption, then adding these independent variables to the network should make it observable whether they make a difference. As in FIG. 4, for well characterized participants, a predictive model can be developed for a single participant and things like hydration, caloric input and equipment can be monitored—step 400. The statistical significance of the new input can be monitored and increases or decreases in performance can be assessed based on the new inputs—steps 402, 404.

To accurately predict energy expenditure for a given route, real-time and historic weather need to be included in the multivariate analysis calculation as they influence friction forces on the trail and on the participant, but also may influence the energy expenditure of the participant. Examples of this are snow on a trail requiring more energy for hikers because they have to lift their feet higher and because of decreased traction. Another example is less efficient energy transfer in certain individuals in high heat and humidity. Sources of this information can be participant manual input or feeds from wireless weather services.

Information that is useful for trail routing comprises the following sensors or participant input that can provide an indication of the parameters below:
1. The map
   Segments (3-dimensional trace of a portion of a trail system that ends at nodes)
   Nodes (decision points where one or more segments intersect or where there is a significant change in routing cost (example: change in slope))
   Historical Weather (if it rained all last week—trails will be muddy and this will affect transit times)
   Real-time Weather (if it is currently raining or frosty, transit time will be increase due to slipperiness).
   Temperature/humidity: efficiency of the user/participant will vary as a function of these parameters
2. Trail Segment Degree of Difficulty/Trail Base Routing Cost (for each Activity)
   Fitness based (Amount of energy required to traverse a trail)
   Agility based—Is the trail rocky or covered by tree roots and other vegetation? Are you able to bike ride a trail segment when others have to walk it)
   Direction (forward or backward along a trail segment)
3. User Profile:
   Fitness level and physical parameters (can be based on user input initially or sensor input such as heart rate monitoring or comparison to other user statistics for a given trail segment and given conditions
   Weight, Body mass index, age, gender
   Agility/Skill Level (how is your balance, reaction time, cadence, etc)
   Endurance (how long can you sustain a certain level of exertion?)
   Equipment Profile: (what kind of tires, gear ratio, running shoes, clothing, etc are you using; what horse you are riding?)
And for individual outings:
   Training mode or recreation; group or individual
   Hydration/Calorie Intake
   Environmental Factors (influence both the trail degree of difficulty and the user profile), such as: wind speed and direction; temperature and humidity; historical precipitation (weekly); and current precipitation.

Equipment utilization, replenishment of water and nutrients, can be kept private as well as the analysis of any performance enhancement resulting from a piece of equipment or regiment. In an embodiment, for general purposes, only an average fitness and agility level for an individual needs to be uploaded to a central processor. This information is necessary to constantly improve the overall quality of rating the degree of difficulty of a trail segment and rating the fitness level of other individuals.

A user profile will be able to be normalized among individual users by establishing a baseline with the usage of sensors or specific measurement. For example, an initial baseline fitness measurement could use the President's Council on Fitness, Sports and Nutrition guidelines for a general indicator, for example you could measure you change in pulse rate before and after a brisk mile walk, how many push-ups can you do? Simple measures of flexibility; measure of body mass index. This will be a starting point for individuals, but for trained athletes, much more information will be necessary. For example a sprinter may be able to do ten times as many push-ups as a distance runner, however both could be in top physical condition for their sport. With a control group of individuals, individual trail segments can be rated as to the degree of difficulty initially by comparing transit times for a segment (in both directions) for a variety of individual with differing fitness documented fitness levels.

Individuals that have a profile backed with a significant amount of data could become testers of equipment. By comparing the equipment against a base line without that particular kind of equipment, improvements in performance could be correlated.

Gaming and competitions can be set up amongst actual individuals or an actually individual against a virtual competitor. Handicaps can be established much as in golf for team competitions. Training regiments can be created where you select a fitness degree and the software informs you if you are performing at above or below the species fitness. Tracking of improvements of fitness can also be tracked.

As trail routes are likely to change more often than a road, the probe traces that go into making a statistically averaged trail segment need to be aged and older segments should be weighted less when developing the average probe trace used to represent to trail segment. How quickly to age a probe will be a function of how many probe traces there are available. Likewise, probes may be of variable quality and precision and probe traces of less quality and precision should be weighted less.

Usage

Figure 5:
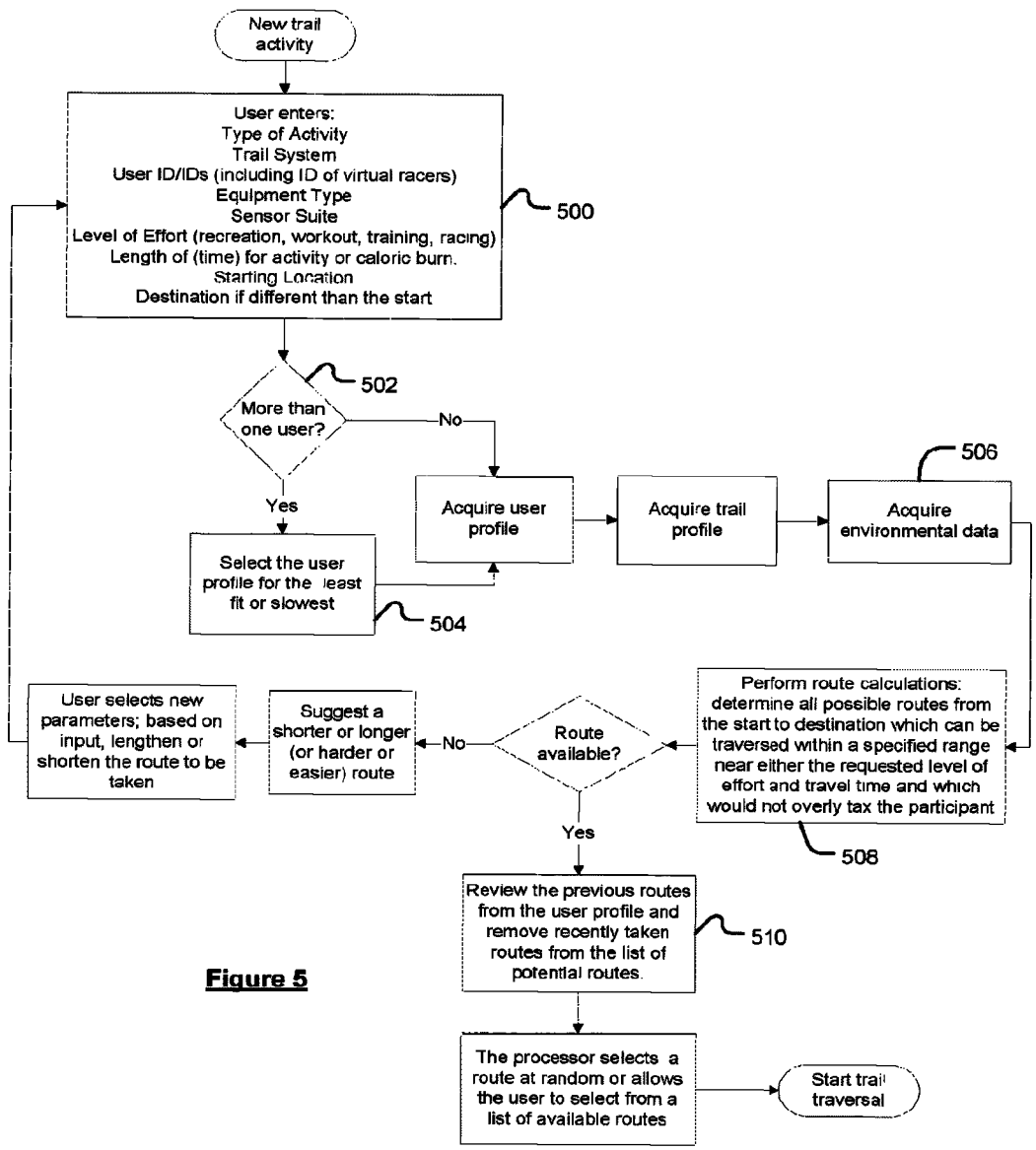
FIG. 5 illustrates the routing process when a participant wishes to traverse a trail.

Once a trail map and routing cost and personal fitness is established then the following can be performed as shown in FIG. 5.

In order to determine a route, a user would input into a navigation device, for example, the following: length of time desired for the activity; type of activity; mode of activity (training, recreation, other); number of members in the group; name of group members (provided they have a profile); trail system to be used (this could also automatically be determined based on the present location or input location); maximum degree of difficulty (do you want to tax yourself or take at easy)—step 500.

The routing algorithm would then determine if it is connected to the network. If it is connected, then the algorithm looks for updates to the trail system of interest; either base costs or changes in geometry—then update the local database. The algorithm will also look for historical and real-time weather information—step 506. A modifier to the overall base costs is determined as a function of, for example, rainfall over the last week (how muddy are the trails), current and predicted rain/snow for today (how slippery are the trails). Other factors taken into account by the algorithm include: the weak link in the group; the size and makeup of the group; a route does not violate the degree of difficulty; a route should not be the same as one recently undertaken—steps 502, 504, 510.

Routing

Given an activity type, trail system, travel time and a level of exertion (and maximum desired exertion) (typically based on a percentage of the range between minimal and maximal heart rate), then a route is suggested.

While in route, communicate one or more of the following:
  alert when heart rate is higher or lower than desired (accounting for the energy required to traverse the current trail segment—may be required to exceed desired heart rate in certain steep or difficult sections).
  give routing directions at intersections (nodes) (audio or visual)
  alert when extra exertions will be required
  display map view of the trail system—colour coding energy consumption per trail segment or maximum slope per trail segment.

Another aspect of this invention is how to provide the routing directions. It has already been shown in vehicles that a navigation device can contribute to driver distraction. When dealing with a sporting activity that requires even more concentration than driving, distraction is even more of an issue. In a training scenario, it is not convenient to stop and look at a map. In addition, since this system would be used primarily outdoors, being able to view a screen in direct sunlight can sometimes be difficult. Accordingly, directions should be delivered preferably either audibly or in a heads up display—to avoid distraction. In addition, to simple: "left turn ahead" type of directions, information on the exertion level for the upcoming segment could be provided. For example, if you are coming to a steep hill that continually goes up for ¾ of a mile, this information could be conveyed to the participant so that they can pace their activity. If the participant has an extensive profile on file and a heart rate monitor was being used, the routing algorithm could predict the pace based on the predicted stamina of the participant and the duration of the exertion. This system is designed to work on portable devices equipped with a GPS or other location sensor, and optionally heart rate monitors or other sensors that can measure energy output of a participant. The portable device, for example can communicate with one or more servers to share information and calculations. The device can be configured to perform routing calculations locally on the device or get them from a server. The device needs at least one of a display, voice communications or text communications. It may also need to be configured to acquire trail information by manual input in certain embodiments.

An embodiment of a method of the invention for determining costs associated with the traversal of off-road navigable segments, e.g. trail segments, of a network of such segments represented by an electronic map will now be described. The electronic map and the segments thereof may be known, or may be generated in a further step using probe data relating to the movement of users with respect to time in a geographic region comprising the segments. The probe data may be collected from devices associated with users in the same manner described in relation to determining the cost data.

Probe data is collected from personal portable training devices associated with different users traversing a given navigable segment of the network. The probe data obtained from each device includes time stamped position data, including elevation data. The probe data additionally comprises data indicative of the exertion of the user e.g. a heart rate of the user associated with the time stamped position data. The exertion e.g. heart rate data is obtained from a suitable sensor associated with the training device, and is indicative of the level of exertion of the user over time as they traverse the segment.

The probe data is collected at a server. An ability, e.g. fitness, profile has been set up for each user. The fitness profile may have been established based upon a questionnaire to which the user has responded, or based on historic performance, etc. Before being used to determine a cost for traversing the given navigable segment, the probe data for a user is processed using the ability profile data for the given user to which the probe data relates. In this way, the probe data may be adjusted to compensate for variation in, for example, fitness levels between different users before it is used to determine a cost for traversing the segment.

The processed probe data obtained from each of the users when traversing a given segment is then used to determine a normalised cost function for traversing the segment. For example, the segment may be assigned an integer in a given range, e.g. 1 to 5 indicative of the relative difficulty (i.e. exertion involved in traversing the segment). This may be achieved using a suitably trained machine learning technique, e.g. neural network.

A normalized cost may then be determined for other segments of the electronic map in a similar manner, and the cost data associated with each segment. The determined cost is associated with each segment in a similar manner to that known for road segments to enable the cost to be used in generating a route through the network of segments.

The cost data may then be used to provide a suggestion of a route through the network of segments for an individual user. For example, the cost data may be used to propose a route that meets a given level of exertion range specified by the user, or which is deemed suitable by reference to an ability, e.g. fitness, profile of the user. The route may alternatively or additionally be one meeting a time, or distance criteria specified by a user.

It will be appreciated that the difficulty of traversing a given segment may depend upon weather conditions or a time of year. Cost data for a given segment may be determined that is time or weather dependent using probe data collected in respect of the relevant period. The relevant cost data for the time or conditions at which a route is to be travelled may then be used in generating a route using the cost data.

It will be appreciated that embodiments of the present invention can be realised in the form of hardware, software or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape. It will be appreciated that the storage devices and storage media are embodiments of machine-readable storage that are suitable for storing a program or programs that, when executed, implement embodiments of the present invention. Accordingly, embodiments provide a program comprising code for implementing a system or method as claimed in any preceding claim and a machine readable storage storing such a program. Still further, embodiments of the present invention may be conveyed electronically via any medium such as a communication signal carried over a wired or wireless connection and embodiments suitably encompass the same.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed. The claims should not be construed to cover merely the foregoing embodiments, but also any embodiments which fall within the scope of the claims.

The invention claimed is:

1. A method for creating cost data for use in generating routes across an electronic map of navigable segments, the method comprising:
    receiving probe data from a plurality of users, the probe data comprising, for each user, movement data indicative of the movements of the user with respect to time, and physical exertion data indicative of at least one measure of physical exertion associated with the movements of the user over time;
    adjusting probe data received from each user by using an ability profile for the user to scale the probe data received from the user;
    determining, based on the probe data, normalized routing cost data for one or more navigable segments of the electronic map;
    associating the routing cost data with the one or more navigable segments of the electronic map, the associating comprising storing, in data for the electronic map, corresponding routing cost data with electronic map data indicative of each of the one or more navigable segments; and
    providing, to a user, a suggested route comprising one or more selected navigable segments of the electronic map, the route being determined based at least in part on routing cost data associated with some or all of the one or more selected navigable segments.

2. The method of claim 1, wherein the probe data comprises movement data indicative of the movements of the multiple users along one or more given navigable segments of the electronic map and associated physical exertion data, and wherein the method comprises processing the probe data from the multiple users relating to travel of the users along the one or more given navigable segments using the ability profile for each user to enable normalized routing costs for each of the one or more given navigable segments to be generated.

3. The method of claim 1, wherein the movement data comprises data indicative of the position of the user with respect to time.

4. The method of claim 3, wherein the position data is received from a location determining and tracking means of a personal portable training device arranged to be transported, carried or worn by a user, and wherein the location determining and tracking means comprises a global navigation satellite systems (GNSS) receiver.

5. The method of claim 1, wherein the physical exertion data is indicative of a heart rate of the user.

6. The method of claim 1, wherein the ability profile is a function of at least a fitness level of the user.

7. The method of claim 1, wherein the cost data is determined using a machine learning process.

8. The method of claim 1, wherein the cost data for the one or more navigable segments is at least one of time and weather dependent.

9. The method of claim 1, wherein some or all of the one or more navigable segments is an off-road segment.

10. The method of claim 1, wherein the route is further determined based in part on user specified parameters.

11. The method of claim 10, wherein the one or more user specified parameters are selected from the group consisting of: activity time, distance, start position, end position, segment type, and level of physical exertion.

12. A non-transitory computer readable medium including a computer program comprising computer program code means adapted to perform the method of claim 1 when said program is run on a computer.

13. An electronic map comprising data representative of a plurality of navigable segments created using a method comprising:
- receiving probe data from a plurality of users, the probe data comprising, for each user, movement data indicative of the movements of the user with respect to time, and physical exertion data indicative of at least one measure of physical exertion associated with the movements of the user over time;
- adjusting probe data received from each user by using an ability profile for the user to scale the probe data received from the user;
- determining, based on the probe data, normalized routing cost data for one or more navigable segments of the electronic map; and
- associating the routing cost data with the one or more navigable segments of the electronic map, the associating comprising storing, in data for the electronic map, corresponding routing cost data with electronic map data indicative of each of the one or more navigable segments.

14. A system for creating cost data for use in generating routes across an electronic map of navigable segments, the system comprising one or more processors, said one or more processors being arranged to:
- receive probe data from a plurality of users, the probe data comprising, for each user, movement data indicative of the movements of the user with respect to time, and physical exertion data indicative of at least one measure of physical exertion associated with the movements of the user over time;
- adjust probe data received from each user by using an ability profile for the user to scale the probe data received from the user;
- determine, based on the probe data, normalized routing cost data for one or more navigable segments of the electronic map;
- associate the routing cost data with the one or more navigable segments of the electronic map, the associating comprising storing, in data for the electronic map, corresponding routing cost data with electronic map data indicative of each of the one or more navigable segments; and
- provide, to a user, a suggested route comprising one or more selected navigable segments of the electronic map, the route being determined based at least in part on routing cost data associated with some or all of the one or more selected navigable segments.

15. The method of claim 3, wherein the movement data further comprises elevation data indicative of the elevation of the user with respect to time.

16. The method of claim 1, wherein the normalized routing cost data for each of the one or more navigable segments comprises a corresponding cost value selected from among a scale of cost values having a plurality of cost values.

17. The method of claim 1, wherein scaling the corresponding probe data compensates for the user's fitness level relative to fitness levels of other users.

* * * * *